United States Patent [19]

Yamada

[11] Patent Number: 5,002,178

[45] Date of Patent: Mar. 26, 1991

[54] TRANSPORT BELT FOR CONVEYING A STIMULABLE PHOSPHOR SHEET AND HAVING A CONDUCTIVE LAYER FOR PREVENTING STATIC CHARGE ON THE SHEET DUE TO CONTACT WITH THE BELT

[75] Inventor: Naoto Yamada, Kanagawa, Japan

[73] Assignee: Fuji Photo Film Co., Ltd., Kanagawa, Japan

[21] Appl. No.: 256,535

[22] Filed: Oct. 12, 1988

[30] Foreign Application Priority Data

Oct. 12, 1987 [JP] Japan .................... 62-256472

[51] Int. Cl.$^5$ ............................................ B65G 15/34
[52] U.S. Cl. ..................................... 198/847; 271/198
[58] Field of Search ................. 271/198; 198/847, 848; 428/457, 458, 462, 465

[56] References Cited

U.S. PATENT DOCUMENTS

| | | | |
|---|---|---|---|
| 3,612,256 | 10/1971 | Limbach et al. | 198/847 |
| 4,064,915 | 12/1977 | Buyssens et al. | 198/847 X |
| 4,250,223 | 2/1981 | Cook | 198/847 |
| 4,296,855 | 10/1981 | Blalock | 198/847 |
| 4,813,533 | 3/1989 | Long | 198/847 |

FOREIGN PATENT DOCUMENTS

| | | | |
|---|---|---|---|
| 144664 | 11/1979 | Japan | 271/198 |
| 160809 | 4/1982 | Japan | 198/847 |
| 289113 | 7/1987 | Japan | 271/198 |

*Primary Examiner*—Michael S. Huppert
*Assistant Examiner*—Kenneth R. DeRosa
*Attorney, Agent, or Firm*—Sughrue, Mion, Zinn, Macpeak & Seas

[57] ABSTRACT

A transport belt for a stimulable phosphor sheet is adapted for placing or transporting a sheet in the clamped state in a transport system of a radiation image information recording and reproducing system. The belt is composed of a fiber layer presenting an undulating surface, an electrically conductive layer formed at least on the front side of the fiber layer, a protective coating formed on the current conductive layer, and a resin layer formed on the back side of the fiber layer. It is durable and prevents generation of static charges on the sheet by the transport belt or deposition of dust and dirt or contamination, while being free from unnecessary stripes attributable to static electricity or white spots attributable to dust and dirt or contamination, so that an extremely clear and accurate image information may be obtained.

6 Claims, 4 Drawing Sheets

TRANSPORT BELT FOR CONVEYING A STIMULABLE PHOSPHOR SHEET AND HAVING A CONDUCTIVE LAYER FOR PREVENTING STATIC CHARGE ON THE SHEET DUE TO CONTACT WITH THE BELT

BACKGROUND OF THE INVENTION

This invention relates to a transport belt for a stimulable phosphor sheet More particularly, it relates to a transport belt for a stimulable phosphor sheet in a radiation image information recording and/or reading device adapted for recording and/or reading the radiation image information of an object to be imaged, whereby it is possible to prevent generation of static charge on the sheet, flaws or contamination of the sheet and deposition of dust and dirt thereon to enable a clearer and more accurate image information to be obtained from the sheet.

PRIOR ART

As a method for producing a radiation image as the image, a so-called radiation imaging system employing a combination of a sensitized paper and a radiation imaging film having an emulsion layer including a silver halide photosensitive material is currently used. As a substitution for the radiation imaging system, attention is recently drawn to a radiation image recording and reproducing system employing a stimulable phosphor.

Certain phosphors, when exposed to radiation rays, such as X-rays, $\alpha$-rays, $\beta$-rays, $\gamma$-rays, electron beams and ultraviolet rays, store part of the energy the radiation possesses. When the phosphor is subsequently exposed to stimulating rays, such as visible light, it produces stimulated emission corresponding to the stored energy. The phosphor exhibiting such properties is known as a stimulable phosphor.

There is proposed a system for recording and reproducing the radiation image information using the stimulable phosphor In such a system, the radiation image information of an object such as a human body is first stored in a sheet having a layer of stimulable phosphor, referred to hereafter as "stimulable phosphor sheet" or simply "phosphor sheet." The sheet is then scanned with stimulating rays which cause the sheet to emit light in proportion to the stored radiation energy. The emitted light is detected by a photoelectric detector to obtain image signals as electrical signals. The image signals are processed to provide a radiation image of the object ready for diagnosis. Reference is made to U.S Pat. Nos. 4,258,264, 4,276,473, 4,315,318 and 4,387,428 and Japanese Application Kokai No. 56-11395.

In such a system, the ultimate image may be reproduced as a hard copy, or reproduced on a display, such as CRT.

In such a radiation ray information recording and reproducing system, the stimulable phosphor sheet is not used to store the image information, but only used to hold the radiation image information temporarily for affording the image ultimately to a recording medium. For this reason, it is preferred that the stimulable phosphor sheet be used repeatedly, especially from economic considerations.

The radiation image information recording and reading device employing the above described radiation image information recording and reproducing system is generally comprised of an image information recording section in which the object is irradiated with radiation rays for recording an image information of the object on the stimulable phosphor sheet, an image reading section in which the stimulable phosphor sheet is irradiated with a stimulating light to cause the sheet to emit the light in the form of optical signals corresponding to the radiation image of the object, said optical signals being then converted into and recorded as the electrical signals, and an erasure section in which a remnant radiation image on the stimulable phosphor sheet from which the image information has been read is irradiated with the erasure light so that the sheet is ready to be reused for radiation image recording. The stimulable phosphor sheets are delivered to or transported between the aforementioned sections by a transport system employing rolls and endless belts, as disclosed for example in the Japanese Patent Application Kokai No. 11240/1984 and the Japanese Patent Application No. 220740/1984.

Referring to FIG. 7, a stimulable phosphor sheet 18 employed in the above described radiation image information recording and reproducing system is generally comprised of a substrate a, a phosphor layer b provided on the substrate, a protective layer c for physically or chemically protecting the surface of the phosphor layer b and a backing layer d provided on the back surface of the substrate a, as shown for example in the Japanese Patent Application Kokai No. 146447/1980. The substrate a is formed of an organic high molecular weight material, such as polyethylene terephthalate, or paper, while the phosphor layer is composed of a binder formed of an organic high molecular weight material, such as nitrocellulose, and particles of the stimulable phosphor dispersed into the binder. The protective layer c is formed by a coating of polyethylene terephthalate, polyethylene, polyvinylidene chloride, polyamide or a cellulose derivative The backing layer d is preferably formed of, for example, polypropylene.

The above described stimulable phosphor sheet 18 is transported through the inside of the radiation image information recording and reading device, as it is clamped between the rolls and the endless belts of the transport system. In general, the rolls and the endless belts are formed of a rubber material or a synthetic material, such as polyester, polyurethane or phenol resin, and a synthetic fiber material. These materials exhibit a high surface resistance and electrical conductivity which is practically nil so that static electricity tends to be generated between the sheet 18 and the rolls or endless belts in the course of the transport operation. More specifically, when the protective layer c is formed of polyethylene terephthalate, static charges are generated between the protective layer c and the rolls of the aforementioned materials, such that minus (−) charges are formed on the protective layer c and plus (+) charges are formed on the backing layer d of polypropylene.

It is noted that, when the stimulable phosphor sheet so charged with static electricity is supplied to the image reading section to produce an image information, the static charges appear as white stripes in the radiation image information concerning the object. This causes an inconvenience when the object to be imaged is a patient, since the lesion site cannot be identified correctly.

Also, when taking out the stimulable phosphor sheet, two or more sheets may be taken out in the state of intimate contact with each other.

When the stimulable phosphor sheet is charged with static electricity and fine dust and dirt floating in the air or the stains become affixed to the sheet, the rolls or the endless belts of the transport system are damaged or contaminated, with the result that the stimulable phosphor sheet in contact with the rolls or belts is correspondingly damaged or contaminated, so that it becomes necessary to replace the rolls or endless belts.

Also, when the dust and dirt or contaminations or stains are affixed to the surface of the stimulable phosphor sheet carrying the stimulable phosphor, emission of light from the portions of the sheet on which the dust and dirt or the contaminations or stains are deposited is impeded in the course of reading the radiation image information, these portions causing corresponding white spots to be produced on the reproduced image. Hence, in a radiation image of a lesion of a cancer, the white spot caused by the dust and dirt or stains cannot be demarcated from white spot indicating the calcified portion of the tissue caused with the progress of the cancer, so that the lesion site cannot be located accurately.

For extending the service life of the transport rolls or the endless belts and preventing damages or flaws or static charges on the stimulable phosphor sheet, it has also been customary to apply an electrically conductive buffer material to the endless belt as with an adhesive This however causes an inconvenience that the buffer material is peeled off during the usage to expose the adhesive which then becomes affixed to the stimulable phosphor sheet to adsorb the dust and dirt or stains thereto.

In addition, the belt of synthetic resin has a smooth surface which may cause the stimulable phosphor sheet to slip so that the sheet tends to be damaged. Also, in the belts of synthetic resin, the resin tends to be exposed at the belt junction to cause additional damages to the sheet.

SUMMARY OF THE INVENTION

It is therefore an object of the present invention to eliminate the above inconveniences of the prior art and to provide a transport belt for a stimulable phosphor sheet, in which the belt adapted for placing or transporting a stimulable phosphor sheet thereon in the clamped state is rendered electrically conductive to prevent generation of static charges on the stimulable phosphor sheet due to contact with the belt as well as to prevent deposition of dust and dirt or stains to allow to produce an image information which is extremely clear and accurate owing to the absence of unnecessary stripes ascribable to static electricity or white spots ascribable to the dust and dirt or contaminants.

According to the present invention, there is provided a transport belt for a stimulable phosphor sheet adapted for transporting a stimulable phosphor sheet on which a radiation image is stored and recorded, said transport belt comprising a fiber layer presenting undulations, an electrically conductive layer formed on the front surface of said fiber layer, a protective coating on said electrically conductive layer for protecting said electrically conductive layer, and a resin layer formed on the back surface of said fiber layer.

Preferably, the electrically conductive layer is formed on both surfaces of the fiber layers Preferably, the electrically conductive layer is a metallic coating layer.

Preferably, the metal coating layer is a metal plating layer.

Preferably, the fiber layer, electrically conductive layer and the protective coating are formed as a cloth woven from yarns composed of a fiber core, an inner metal layer and an outer protective coating layer.

Preferably, the metal plating is a nickel plating.

BRIEF DESCRIPTION OF THE INVENTION

DETAILED DESCRIPTION OF THE INVENTION

Figure 1:
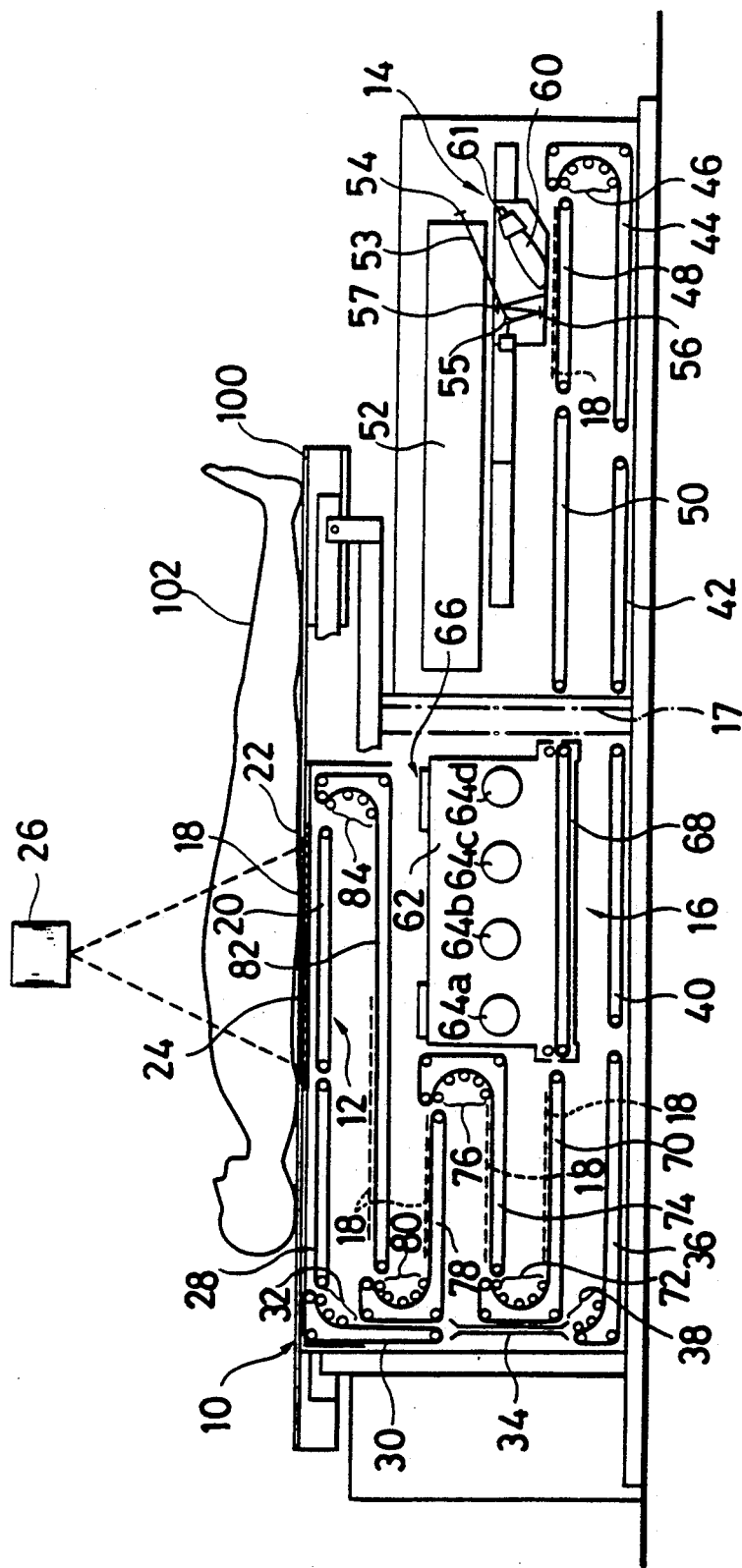
FIG. 1 is a longitudinal sectional view showing a radiation image recording and reproducing device including transport belts for stimulable phosphor sheets according to the present invention.

In the accompanying drawings, there is illustrated a transport belt for stimulable phosphor sheet according to a preferred embodiment of the present invention Reference is first made to FIG. 1 for illustrating a radiation image information recording and reading device which is provided with an image recording station, an image reading station and an erasure station and adapted to transport a plurality of stimulable phosphor sheets from the recording station through the reading station to the erasure station and back to the recording station in a circulating manner by a transport system employing a transport belt constructed in accordance with the present invention.

The radiation image information recording and reading device 10 is basically composed of the image recording station or section 12, the image reading station or section 14 and the erasure station or section 16 for erasing the remnant image information on the stimulable phosphor sheets so that the sheets are again ready for recording the image information.

The device 10 also includes the transport system for supplying the stimulable phosphor sheets to each of the section 12, 14 and 16 and transporting the sheets between the sections The transport system is composed of a plurality of rolls and a plurality of transport belts or belt conveyors constructed in accordance with the present invention. The stimulable phosphor sheets are transported while they are clamped and sandwiched between the rolls and the belt conveyors.

A light barrier member 17 is provided in the image reading section 14 for preventing light invasion from the erasure section 16, as indicated by a chain-dotted line in FIG. 1. In the image recording section, there are provided a first belt conveyor 20 for positioning the stimulable phosphor sheets 18 and a Bucky's device 22 provided above the belt conveyor 20 for preventing the scattering of radiation rays. On top of and away from an imaging surface 24 of the image recording section 12, there is provided an imaging device 26 including a source of radiation rays.

In proximity to the positioning belt conveyor 20, there is provided a second belt conveyor 28, which is confronted by a third belt conveyor 30 having a bend. A roll set 32 composed of three rolls is provided at the bend of the belt conveyor 30.

Below the third belt conveyor 30, there is provided a guide plate 34, which is confronted by a fourth belt conveyor 36 having a bend provided below the guide plate 34. A second roll set 38 is provided at the bend of the fourth belt conveyor 36.

In proximity to the fourth belt conveyor 36, there is provided a fifth belt conveyor 40, which is confronted by a sixth belt conveyor 42 provided in the interior of the image reading section 14. The other extreme end of the sixth belt conveyor 42 faces to a seventh belt conveyor 44 having a bend at the bend of which is provided a third roll set 46. At the outlet ends of the roll set 46 and the seventh belt conveyor 44, an eighth belt conveyor 48 and a ninth belt conveyor 50 are arranged along a straight line. On top of the belt conveyors 48 and 50, there are provided a laser light source 52 and an optical system for sweeping an output laser light 53 mainly along the widthwise direction of the stimulable phosphor sheet 18 on the belt conveyor 48, that is, a mirror 54, a galvanometer mirror 55 and mirrors 56, 57. There is also provided a light guide 60 having an incident extreme end facing to the main sweeping line of the laser light 53 and an outgoing extreme end connected to a photomultiplier 61.

The ninth belt conveyor 50 has its one end facing to the erasure station 16 by way of the light barrier member 17. The erasure section 16 is basically composed of a casing 62, a plurality of erasure light sorces 64a to 64d provided in juxtapositon to one another in the interior of the casing 62, cooling air flowing means including a forced cooling air blower, not shown, provided to one side of the casing 62, air vent means 66 including an air vent fan provided above the casing 62, and transport means 68 provided at the bottom of the casing 62 Exteriorly of the transport means 68 of the erasure section 16, there is provided a tenth belt conveyor 70 having a bend, at the bend of which is provided a fourth roll set 72. In continuation with the tenth belt conveyor 70, there is provided an eleventh belt conveyor 74 having a bend, at the bend of which is provided a fifth roll set 76. Adjacent to the eleventh belt conveyor 74 and the fifth roll set 76, there is provided a twelfth belt conveyor 78 having a bend, at the bend of which is provided a sixth roll set 80. Adjacent to the twelfth belt conveyor 78, there is provided a thirteenth belt conveyor 82 having a bend, at the bend of which is provided a seventh roll set 84.

The radiation image information recording and reading device 10 is constructed basically as described herein above. The first to the thirteenth belt conveyors, above all, the transport belt for stimulable phosphor sheets of the present invention, empolyed in these belt conveyors, will be explained by referring to FIGS. 2 to 6.

Figure 2:
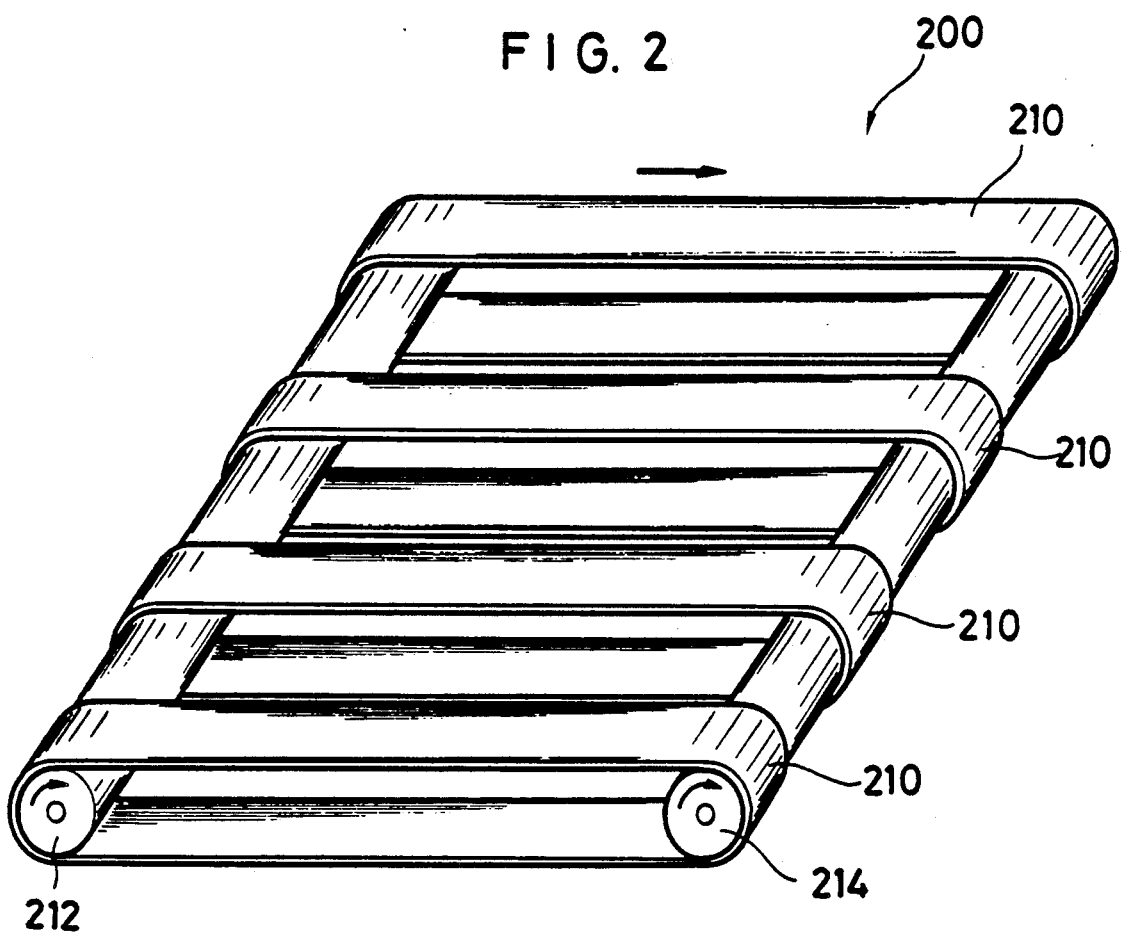
FIG. 2 is a perspective view showing an embodiment of a belt conveyor employing a transport belt for a stimulable phosphor sheet according to the present invention.
Figure 3:
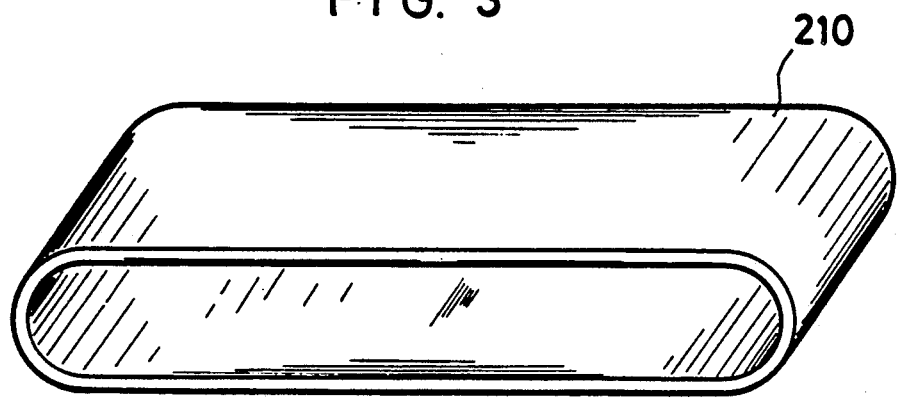
FIG. 3 is a perspective view of a stimulable phosphor sheet according to the present invention.
Figure 4:
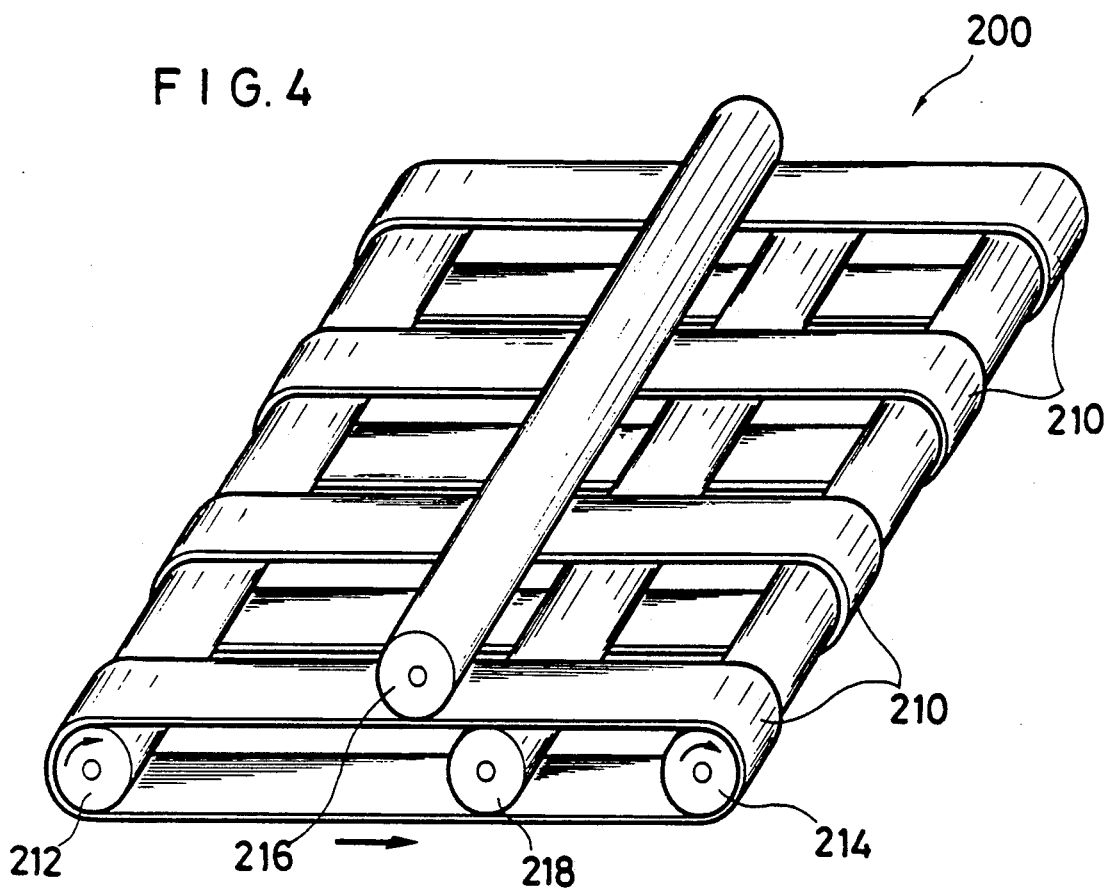
FIG. 4 is a perspective view showing a modified embodiment of a belt conveyor employing a transport belt for a stimulable phosphor sheet according to the present invention.

Turning first to FIG. 2, a belt conveyor 200 is formed by four transport belts 210 shown in FIG. 3 and two rolls 212, 214 about which the belts 210 are placed under tension.

In the embodiment shown in FIG. 2, the belt conveyor 200 is adapted to transport stimulable phosphor sheets 18 placed thereon. If necessary, above all, when the belt conveyor 200 is used at bends or mounted at vertically running portions, a sheet presser roll 216 may be provided above the belt conveyor 200 so that the stimulable phosphor sheets will be transported as they are clamped and sandwitched between the belt conveyor 200 and the sheet presser roll 216. The sheet presser roll 216 may be provided at any desired location along the belt conveyor 200 as a function of the mounting position of the belt conveyor 200. In case of too long an interval between the rolls 212 and 214, the transport run or length of the belt 200 is increased. For this reason, a belt supporting roll 218 may be provided halfway for preventing belt sagging, as shown for example in FIG. 4.

Figure 5:
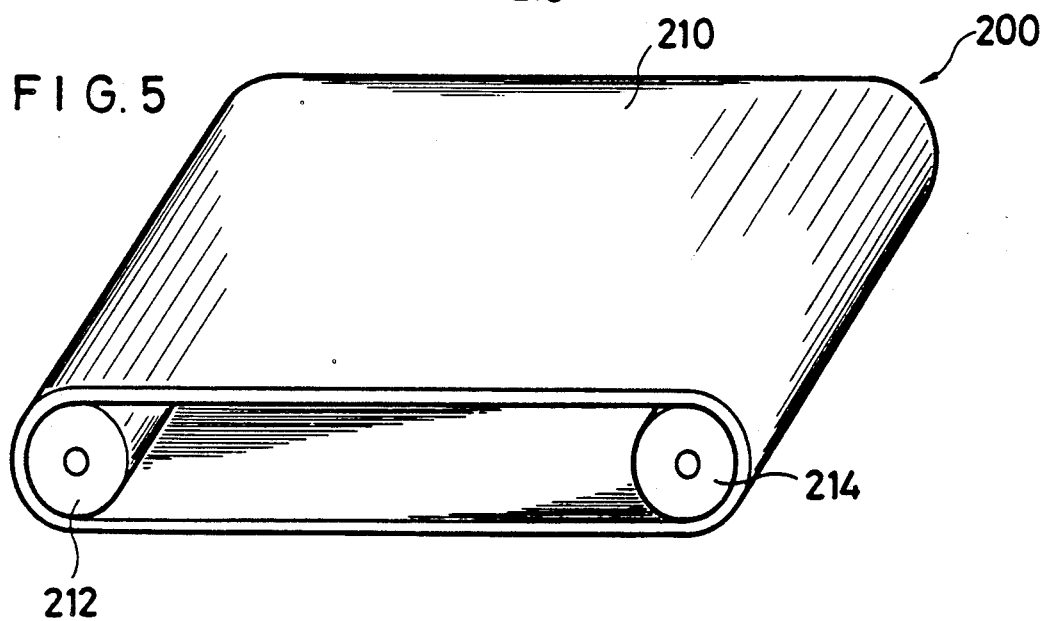
FIG. 5 is a perspective view showing another modified embodiment of a belt conveyor employing a transport belt for a stimulable phosphor sheet according to the present invention.

In the embodiment shown in FIG. 2, the belt conveyor 200 is formed by four transport belts 210. However, the present invention is not limited thereto and any desired number of transport belts 210 may be used if the satisfactory transport state of the belt conveyor 200 is thereby achieved The belt conveyor may also be constructed by a single transport belt 210, as shown in FIG. 5.

The width of the transport belt 210 may be determined as a function of the number of transport belts 210 employed. Also the transport belts 210 employed in one and the same belt conveyor 200 may preferably be of the same width, but may also be different widths The construction of the transport belt for stimulable phosphor sheets of the present invention will now be explained by referring to the cross-sectional view of FIG. 6.

Figure 6:
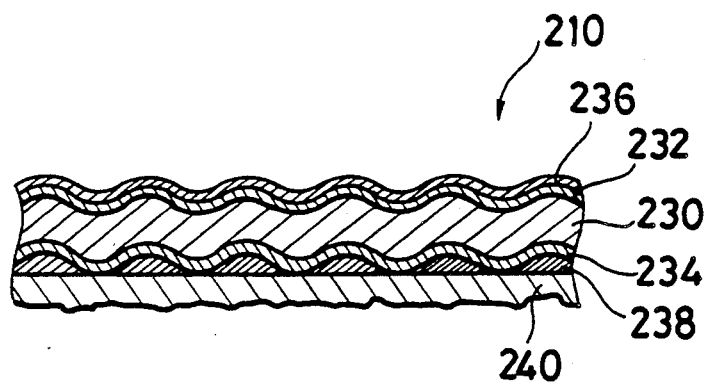
FIG. 6 is a sectional view showing the construction of a transport belt for a stimulable phosphor sheet according to the present invention.
Figure 7:
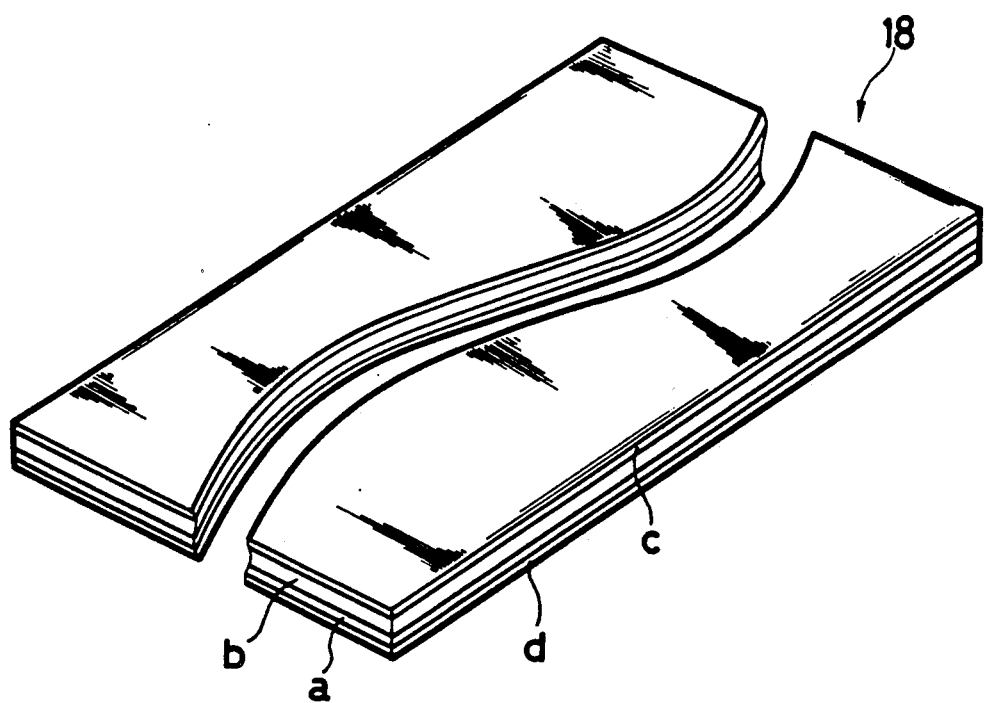
FIG. 7 is a perspective view of a stimulable phosphor sheet, shown cut through to show the cross-section of the sheet.

As shown in FIG. 6, the transport belt 210 is comprised of a central fiber layer 230 having irregular or undulated upper and lower sides and current conducting layers 232, 234 on both sides of the fiber layer 230. A protective coating 236 for protecting the conductive layer 232 is formed on the conducting layer 232, and a resin layer 240 is bonded to the other conducting layer 234 with an adhesive 238.

The fiber layer 230 forms the core of the base cloth of the transport belt 210. Any cloth or fabric may be used as the fiber layer on the condition that it is able to stand the tension applied to the transport belt 210 without elongation or breakage. Above all, the cloth or fabric or synthetic fibers, such as polyester, nylon, aramide or acrylic fibers are preferred Above all, a cloth formed by polyester fibers is preferred.

The cloth having undulated upper and lower sides may be employed, such as woven, knitted and non-woven fabrics. As the woven fabrics, of satin weave, twill weave or plain weave are preferred. Preferably, ducks of satin weave and, more preferably, ducks of satin weave produced with the use of five heddles are employed It suffices that the layers 232 and 234 be the coating layers of electrically conductive materials. However, it is preferred that the layers be metallic coating layers. The metallic coatings may be formed in any desired manner and with the use of any desired metallic materials, on the condition that the fiber layer 230 can be coated satisfactorily by the metallic coating and that the conductive layers 232 and 234 and the fiber layer 230 are bonded together satisfactorily. Examples of the coating metals include nickel, copper, tin and silver, with nickel being most preferred. The most preferred coating method is plating. The conductive layers 232 and 234 may have any desired thickness on the condition that a sufficient current conducting effect is achieved Since the fiber layer 230 is coated by the current conducting layers 232, 234, it is possible to prevent fluffing of the fiber layer 232.

A protective coating 236 for protecting the conducting layer 232 represents the outermost layer of the transport belt 210 and presents irregularities or undulations proper to the fiber layer 230. It is the portion of the transport belt which contacts directly with the stimulable phosphor sheet 18

For this reason, the protective coating 236 is preferably of a white color or colorless, so as not to contaminate the phosphor surface of the stimulable phosphor sheet. The protective coating 236 is preferably of a reduced film thickness, on the condition that it is able to protect the conducting layer 232. With increased thickness of the coating 236, the current conducting properties of the conductive layer 232 on the coating surface are lost and it becomes impossible to prevent eletrical charging of the phosphor sheet 18. The protective coating 236 may be of any desired material, on the condition that the phosphor surface of the stimulable phosphor sheet 18 is not thereby inpaired, the conducting layer 232 can be protected thereby sufficiently and the thickness of the protective coating may be reduced. For example, the coatings of acrylic resin, urethane resin, nylon resin or of ester resin and, above all, the coating of acrylic resin, are preferred.

The resin layer 240 represents the innermost layer of the transport belt 210, and is bonded to the other conducting layer 234 with an adhesive 238. This resin layer 240 is the surface by which the transport belt contacts the rolls. For this reason, the surface of the resin layer 240 is subjected to roughing in order to prevent slipping of the resin layer in contact with the rolls and to trasmit the rotation of the rolls positively to the transport belt. It is preferred that the resin layer 240 be processed previously to render it electrically conductive.

The resin layer 240 may be formed of any desired resin and preferably of urethane resin, soft vinyl chloride resin, nylon elastomer or an ester elastomer. The urethane resin is most preferred. The current conducting material that is mixed into the resin for imparting current conductivity to the resin layer 240 is preferably carbon or metal flakes, above all, carbon.

In the embodiment shown in FIG. 6, electrically conductive layers 232 and 234 are provided on both sides of the fiber layer 230. However, this is not limitative and only one side of the fiber layer may be provided width the electrically conductive layer. in such case, the transport belt is preferably constrcted in such a manner that the side of a phosphor layer b of the stimulable phosphor sheet will face to the side of the transport belt which is provided with the electrically conductive layer.

In the embodiment shown in FIG. 6, a previously finished cloth is used as the fiber layer 230 and electrically conductive layers 232, 234 are formed on this cloth to provide a base cloth. However, this is not limitative of the present invention and, for example, yarns each having an electrical conductivity may be woven into a wove fabric to provide a base cloth.

The belt materials having the above described crossectional constructon may then be joined together to provide an endless belt having a desired length Any desired type of joints, such as finger joint, skiver joint or step joint, may be employed at the junctions of the joint 210, on the condition that no step difference is formed and the stimulable phosphor sheet may be transported smoothly when the belt is driven into operation as it is placed around the rolls. The finger joint is most preferred.

OPERATION

The operation of the radiation image information recording and reading device provided with the transport system employing the transport belt according to the present invention is explained herein below.

With an object 102 to be imaged, such as a human body, lying lengthwise on a ceiling plate 100 of the radiation image information recording and reading device 10, radiation rays are radiated towards the object 102 from an imaging device 26. The radiation rays are transmitted through the imaging surface 24 so that a radiation image of a desired portion of the object 102 is recorded on the stimulable phosphor sheet 18 The scattering of the radiation rays is prevented by the Bucky's device 22. The stimulable phosphor sheet 18 so recorded is then transported towards the image reading section 14. The sheet 18 is transported through the belt conveyor 28 to the belt conveyor 30 having the bend and thence to the belt conveyor 36 through the guide plate 34. The stimulable phosphor sheet 18 exiting the belt conveyor 36 is transported through the belt conveyors 40, 42 and 44 so as to be positioned on the belt conveyor 48

It is noted that the belt conveyors 28, 30, 36, 40, 42, 44 and 48 constituting the transport system are designed and arranged as shown at 200 in FIG. 2, and are each formed of the four transport belts 210 for the stimulable phosphor sheets of the present invention The transport belt 210 is designed and arranged as shown in FIG. 6 and has a high electrical conductivity, with the volume surface resistivity of not higher than 1 ohm/m, so that it is not charged electrically even when the stimulable phosphor sheet 18 is transported as it is placed thereon or in the clamped state Also, the transport belt 210 of the present invention is formed by the fiber layer 230 coated by metal or the like electrically conductive material, so that the fluffing or contamination of the fiber layer 230 or deposition of dust and dirt on the fiber layer is prevented positively. The resin material is also not exposed at the belt junctions so that the stimulable phosphor sheet 18 is not thereby injured.

In this manner, the belt conveyor 200 for the stimulable phosphor sheet employing the transport belt 210 of the present invention may be transported smoothly without deposition of dust and dirt or injury and without the stimulable phosphor sheet 18 becoming charged electrically, so that the belt conveyor 200 is improved in durability.

With the stimulable phosphor sheet 18 positioned on the belt conveyor 48, an output laser light 53 from a laser light source 52 performs a main sweeping or scanning movement on the stimulable phosphor sheet 18, by the reciprocating operation of the galvanometer mirror 55. In synchronism with this main sweeping or scanning, the stimulable phosphor sheet 18 is transported by the belt conveyor 48 in a direction approximately orthogonal to the main sweeping direction to perform a sub-sweeping. As a result, the stimulable phosphor sheet 18 produces stimulated emission on the basis of the image information of the object 102 stored and recorded in the sheet This emitted light is transmitted by way of a light guide 60 to a photomultiplier 61 where it is read photo-electrically and converted into corresponding electrical signals based on which the radiation image of the object is directly displayed for example on a CRT, not shown, or recorded on a recording material, such as a photosensitive material The stimulable phosphor sheet 18 thus stimulated to emit light still holds the remnant image information. Therefore, the stimulable phosphor sheet 18 is transported to the erasure section 16 by way of the belt conveyor 50. The stimulable phosphor sheet 18, held in sliding contact with the transport means 68, is introduced in to the casing 62. As the sheet 18 has been transported to a prescribed position, the transport means 68 is stopped. At this time, the light sources 64a to 64d are turned on so that the erasure light is uniformly radiated to the sheet 18 carrying the remnant image information Simultaneously, the cooling air blowing means and the air vent means 66 are driven into operation and any heat evolved from the light sources 64a to 64d is discharged to the outside of the casing 62 so that the remnant image information on the sheet 18 is erased as the sheet 18 is maintained at a lower temperature and thus without being heated excessively.

After lapse of a predetermined time, the residual image on the sheet 18 is erased completely. At this time, the transport means 68 are again actuated to transport the sheet out of the casing 62 and onto the transport belt conveyor 70.

The sheet 18 is then transported on the belt conveyors 70, 74, 78 and 82, in this order, so as to be ready for the next radiation image recording operation.

These belt conveyors 70, 74, 78 and 82 are also designed as the transport belts for the stimulable phosphor sheets according to the present invention, so that the sheet may be transported smoothly without becoming electrically charged or without deposition of dust and dirt thereon.

Although the present invention has been described with reference to preferred embodiments of the transport belt for stimulable phosphor sheets, it is to be noted that the present invention is not limited to these specific embodiments, but various changes may be made thereto without departing from the spirit and scope of the invention.

EFFECT OF THE INVENTION

According to the present invention, as described in detail herinabove, the belt conveyor adapted for placing or transporting a stimulable phosphor sheet thereon is formed by a transport belt comprised of a fiber layer as the core material, electrically conductive layer on one side or both sides or on the overall perimeter of the fiber layer, an electrically conductive resin layer on the roll side of the belt and a protective coating on the stimulable phosphor sheet side of the belt. As a result, the belt conveyor has high electrical conductivity so that it is possible to prevent formation of static charges on the stimulable phosphor sheet Also, according to the present invention, the above described belt presenting undulations is used for transporting the stimulable phosphor sheet, it is possible to prevent flaws or contamination or deposition of dust and dirt on the stimulable phosphor sheet Therefore, in accordance with the present invention, the conveyor belt is improved in durability, while the maintenace costs of the overall radiation image recording and reproducing system may be lowered

EXAMPLE

The present invention will be explained with reference to several Examples and Running Tests.

Sliding tests for evaluation of the flaw resistance by a slide tester and tests on the flaw resistance and running properties by a transport unit were performed for evaluating the properties of the transport belt for the stimulable phosphor sheet The tested transport belt was formed of the following materials.

It is noted that the front surface means the surface on which the stimulable phosphor sheet is placed and the back surface the surface by which the sheet is placed under tension around the pulleys

INVENTIVE EXAMPLE

A belt F is 45 mm wide and 0.8 mm thick. The core material is formed of polyurethane and has a thickness (t) of 0.4mm and a black color. The front surface of the belt F is a polyester duck plated with nickel in order to render the belt anti-static, and is provided with a resin coating. The front surface is irregular or undulated and has a thickness (t) of 4mm. The back surface of the belt presents undulations or irregularities proper to the surface of the core material and has a black color.

COMPARATIVE EXAMPLE

A belt A has a width of 45mm and a thickness (t) of 0.5mm. The core material is a duck of polyester with a thickness (t) of 0.4mm. The front surface of the belt is formed of polyurethane and black in color and has a thickness (t) of 0.1mm. The front surface is smooth and previously subjected to anti-static processing. The back surface is the front surface of the core material.

A belt B has a width of 45mm and a thickness (t) of 0.7mm. The core material is an endless polyester woven fabric having a thickness (t) of 0.5mm. The front surface of the belt B is an impregnated nitrile rubber layer of black color with a thickness (t) of 0.1mm. The front surface is previously subjected to anti-static processing and presents undulations or irregularities. The rear surface is a ground nitrle rubber layer with a black color and a thickness (t) of 0.1mm.

A belt C has a width of 45mm and a thickness (t) of 0.7mm. The core material is a duck of polyester with a thickness (t) of 0.5mm. The front surface is the core material presenting undulations or irregularities of white color. The rear surface is formed of polyurethane and has a thickness (t) of 0.2mm and a black color. The rear surface is smooth and previously subjected to anti-static processing.

A belt D has a width of 45mm and a thickness (t) of 0.5mm. The core material is formed of "Clarino" (nylon) and previously subjected to anti-static processing and has a thickness of 0.3mm.

The front surface of the belt D is "clarino" (nylon) and previously subjected to special processing. It has a thickness of 0.3mm, and presents irregularities and undulations.

A belt E is same as the belt A except that a Toray Pef, produced by the Toray KK, with a thickness of 1.0mm, is bonded on the surface of the belt A as a buffer material.

EXAMPLE 1

Each belt material carrying a load weight was caused to slide on a stimulable phosphor sheet. The sheet was observed as to the flaws and contaminations on the surface of the phosphor layer of the sheet both visually and with the image formed on the X-ray film after reading the image information in the computer The results are shown in Table 1.

The test conditions were as follows: The sliding period T, 0.5 sec; the sliding distance 1 80mm; the contact pressure to the stimulable phosphor sheet P, 5.8 g/cm$^2$, no dust and dirt on the sheet; the number of times of sliding in reciprocation, 10,000.

The marks, X and XX for evaluation by visual check indicate no grazing or stain, a large number of grazings and stains and a very large number of grazings and stains, respectively.

The marks , X and XX for evaluation by the inspection of the image formed on the X-ray film indicate no gazing or stain, a large number of grazings and stains and a very large number of grazings and stains, repectively.

TABLE 1

| Belt materials | Surface material | Grazing visual | Grazing displayed image | Contamination visual | Contamination displayed image |
|---|---|---|---|---|---|
| Belt A | Polyurethane | X | X | XX | XX |
| Belt B | Black-colored nitrile rubber | X | X | XX | XX |
| Belt C | Polyester | ◯ | ◯ | ◯ | ◯ |
| Belt D | Clarino (nylon) | ◯ | ◯ | ◯ | ◯ |
| Belt E | Pef | ◯ | ◯ | ◯ | ◯ |
| Belt F | Polyester | ◯ | ◯ | ◯ | ◯ |

It is seen from Table 1 that the belt materials of the belts C, D, E and F are less prone to cause flaws or stains or deposition of the dust and dirt on the stimulable phosphor sheet than the belt materials of the belts A and B.

It is also seen that the undulated or irregular surface is less liable to cause flaws and therefore more excellent than the flat surface.

EXAMPLE 2

The sliding tests on the belt materials of the belts C and F and the junctions were conducted in the same way as in Example 1 and a comprehensive evaluation was made as to the flaws, stains and the deposition of dust and dirt both by a visual check and inspection of the image formed on the X-ray film. The test conditions are same as those used in Example 1, except that tests were also conducted with a "dust and dirt present" condition with the use of the test dust prescribed by JIS Z 8901. The results are shown in Table 2.

The belt D was excluded since nylon has only poor temperature and humidity chracteristics with repect to elongation and is not suitable to be used as the conveyor belt.

The marks and X for evaluation indicate no grazing or stain and no dust and dirt deposition, and more or less grazings or stains and deposition of dust and dirt, respectively.

TABLE 2

| Belt materials | | Slide test junction | |
|---|---|---|---|
| Belt C | ◯ | X | At the initial stage, several black polyurethane stains appear at the junction |
| Belt F (plated) | ◯ | ◯ | Resin exposure at the joint is inhibited by plating |

It is seen from the results of Table 2 that the belt C presents more stains at the junctions than the belt F so that it is inferior as the transport belt for the stimulable phosphor sheet.

EXAMPLE 3

Test on Flaw Resistance

The belts C, E and F were used as the endless belts of a transport unit having an overall length of 0.8 m and a bend with a radius of 0.075m. The test on the flaw resistance was conducted with the stimulable phosphor sheet moved back and forth 5,000 times at the bend of the transport unit, and the evaluation as to the grazings, stains and deposition of dust and dirt was made both by visual check and inspection of the image on the X-ray film. The results are shown in Table 3.

The marks and X for evaluation indicate no grazing, stain or dust and dirt deposition and more or less grazings, stains or depositon of dust and dirt, repectively.

Test on Running Properties

For checking the pliability, the belt materials were formed into rings each having a diamiter of 30mm and a weight load was placed on the top of each ring. The weight in grams of the load when the ring was collapsed to 20mm was measured The conditions of the temperture of 10° C. and the relative humidity of 20% were used. The results are shown in Table 3.

Using the same transport unit as that used in the flaw resistance test, the load torque in kg.cm when the stimulable phosphor sheet was transported on the transport unit was measured. The surface potentials of the stimulable phosphor sheet and the belt in kV after 10 times of reciprocating transport operations were also measured. The results are also shown in Table 3.

TABLE 3

| Belt materials | Flaw resistance transport unit | Running properties 10° C. 20% transport unit | | | |
|---|---|---|---|---|---|
| | | pliability gr | load torque kg.cm | phosphor sheet surface potential kV | belt surface potential kV |
| Belt C | ◯ | 20 | 1.7–4.0 | 0.4 | −0.1–+0.3 |
| Belt E | ◯ | 105 | 2.5 | 0.48–0.78 | −0.5–+1.0 |
| Belt F | ◯ | 20 | 0.9–1.0 | 0.15 | 0 |

It is seen from the results of Table 3 that, although the belts C, E and F do not differ markedly as to the resistance to flaws by the transport unit, the belt F of the Example of the present invention is superior in running properties since it presents a load torque and a surface potential of both the stimulable phosphor sheet and of the belt lesser than those of the belt C or E of the Comparative Example.

What is claimed is:

1. A transport belt for a stimulable phosphor sheet adapted for transporting a stimulable phosphor sheet on which radiation image information is stored and recorded, said transport belt comprising a fiber layer presenting undulations, an electrically conductive layer formed on the front surface of said fiber layer, a protective coating on said electrically conductive layer for protecting said electrically conductive layer, and a resin layer formed on the back surface of said fiber layer, whereby generation of static charge on the stimulable phosphor sheet due to contact with said belt is prevented.

2. A transport belt for a stimulable phosphor sheet according to claim 1 wherein said fiber layer, electrically conductive layer and the protective coating are formed as a cloth woven from a yarn composed of a fiber core, an inner metal plating layer and an outer protective coating layer.

3. A transport belt for a stimulable phosphor sheet according to claim 1 wherein said electrically conductive layer is formed on both surfaces of the fiber layer.

4. A transport belt for a stimulable phosphor sheet according to claim 1 or 3 wherein said electrically conductive layer is a metallic coating layer.

5. A transport belt for a stimulable phosphor sheet according to claim 4 wherein said metal coating layer is a metal plating layer.

6. A transport belt for a stimulable phosphor sheet according to claim 4 wherein said metal plating is nickel plating.

* * * * *